(12) United States Patent
Adams et al.

(10) Patent No.: US 7,779,856 B2
(45) Date of Patent: Aug. 24, 2010

(54) FUEL CARTRIDGE OF A FUEL CELL WITH FUEL STORED OUTSIDE FUEL LINER

(75) Inventors: Paul Adams, Monroe, CT (US);
Andrew J. Curello, Hamden, CT (US);
Floyd Fairbanks, Naugatuck, CT (US);
Constance R. Stepan, Oxford, CT (US)

(73) Assignee: Societe BIC (FR)

( * ) Notice: Subject to any disclaimer, the term of this patent is extended or adjusted under 35 U.S.C. 154(b) by 760 days.

(21) Appl. No.: 11/244,218

(22) Filed: Oct. 5, 2005

(65) Prior Publication Data

US 2007/0077463 A1 Apr. 5, 2007

(51) Int. Cl.
F04F 1/00 (2006.01)

(52) U.S. Cl. ........................... 137/210; 222/399

(58) Field of Classification Search ................. 137/209, 137/210; 222/386–389, 399
See application file for complete search history.

(56) References Cited

U.S. PATENT DOCUMENTS

| | | | |
|---|---|---|---|
| 3,898,798 A * | 8/1975 | Williams ..................... 60/207 |
| 4,254,887 A | 3/1981 | Bold | |
| 4,969,577 A * | 11/1990 | Werding ..................... 222/94 |
| 5,979,481 A | 11/1999 | Ayresman | |
| 6,111,187 A | 8/2000 | Goyette | |
| 6,360,729 B1 | 3/2002 | Ellsworth | |
| 6,460,733 B2 | 10/2002 | Acker et al. | |
| 6,506,513 B1 | 1/2003 | Yonetsu et al. | |
| 6,527,002 B1 | 3/2003 | Szakaly | |
| 6,660,421 B2 | 12/2003 | Merin Celemin et al. | |
| 6,681,789 B1 | 1/2004 | Moulis et al. | |
| 6,808,833 B2 * | 10/2004 | Johnson ..................... 429/19 |
| 7,117,732 B2 * | 10/2006 | Curello et al. ............... 73/149 |
| 7,172,825 B2 * | 2/2007 | Adams et al. ................ 429/12 |
| 7,255,947 B2 * | 8/2007 | Becerra et al. ............... 429/13 |
| 2002/0127451 A1 | 9/2002 | Cao et al. | |
| 2002/0197522 A1 | 12/2002 | Lawrence et al. | |
| 2003/0008193 A1 | 1/2003 | Kinkelaar et al. | |
| 2003/0082427 A1 | 5/2003 | Prasad et al. | |
| 2003/0218027 A1 * | 11/2003 | Schiestl et al. ............. 222/183 |
| 2005/0008908 A1 * | 1/2005 | Kaye et al. ................... 429/20 |
| 2005/0058874 A1 * | 3/2005 | Drake et al. .................. 429/34 |
| 2005/0058879 A1 * | 3/2005 | Guay ........................... 429/38 |
| 2006/0172171 A1 * | 8/2006 | Deinzer et al. ............... 429/34 |

FOREIGN PATENT DOCUMENTS

WO  WO 03/043112 A1 *  5/2003

OTHER PUBLICATIONS

International Search Report and Written Opinion issued in connection with corresponding international application No. PCT/US06/38849 mailed Jun. 26, 2008.
European Search Report issued in connection with corresponding European Patent Application No. 06816254.4 on Sep. 29, 2009.

* cited by examiner

*Primary Examiner*—John Rivell
*Assistant Examiner*—Craig M Schneider
(74) *Attorney, Agent, or Firm*—The H.T. Than Law Group

(57) ABSTRACT

A fuel supply connectable to a fuel cell is disclosed. The fuel supply comprises an outer casing and a fuel liner and an effective amount of fuel in the space between the outer casing and the fuel liner to control the pressure inside the fuel liner. In one example, the fuel inside the fuel liner is methanol, and the fuel between the outer casing and the fuel liner is methanol or methanol gel.

44 Claims, 4 Drawing Sheets

FUEL CARTRIDGE OF A FUEL CELL WITH FUEL STORED OUTSIDE FUEL LINER

FIELD OF THE INVENTION

This invention generally relates to fuel cartridges for fuel cells, and more particularly this invention relates to fuel supplies having an outer casing and an inner fuel container, wherein a fuel is stored between the casing and the fuel container.

BACKGROUND OF THE INVENTION

Fuel cells are devices that directly convert chemical energy of reactants, i.e., fuel and oxidant, into direct current (DC) electricity. For a number of applications, fuel cells can be more efficient than conventional power generation, such as combustion of fossil fuel, and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. Solid oxide fuel cells (SOFC) convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a metal hydride, such as sodium borohydride, reformer fuel cell is as follows:

$$NaBH_4 + 2H_2O \rightarrow (\text{heat or catalyst}) \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference.

One of the important features for fuel cell application is fuel storage. The fuel supply should also be easily inserted into the fuel cell or the electronic device that the fuel cell powers. Additionally, the fuel supply should also be easily replaceable or refillable. When a liquid fuel such as methanol is stored in the fuel supply or in a fuel liner within the fuel supply, pressure builds within. There remains a need for a fuel supply where the pressure on the fuel liner is equalized to reduce the stress placed on the fuel liner.

SUMMARY OF THE INVENTION

The invention is directed to a fuel supply connectable to a fuel cell comprising at least an outer casing and an inner fuel container storing fuel for the fuel cell. An amount of fuel is added between the outer casing and the inner fuel container to control the pressure inside the fuel supply. The fuel supply can further comprise a check valve disposed on the outer casing that can regulate the pressure in the space between the outer casing and the inner fuel container. The fuel between the outer casing and the inner fuel container serves as a barrier or buffer zone to minimize the permeation of fuel from the inner fuel container to the atmosphere. This fuel also vaporizes at substantially the same rate as the fuel inside the inner fuel container, so that the fuel vapor pressure inside the inner fuel container is substantially the same as the fuel vapor pressure in the space between the outer casing and the inner fuel container.

In one preferred embodiment, the outer casing is more rigid than the inner fuel container and provides structure to the fuel supply. Preferably, the inner fuel container is flexible or deformable. The fuel contained between the outer casing and the inner fuel container is preferably chemically similar to the fuel inside the inner fuel container and, more preferably, substantially the same. In one example, the fuel inside the fuel container is methanol and the fuel between the outer casing and inner fuel container is methanol or a fuel similar to methanol, such as ethanol, propanol and other alcohols, in liquid, gaseous or gel form.

The fuel supply may further comprise an outer fuel container encasing the inner fuel container, and the space between the outer fuel container and inner fuel container may be filled with another fuel similar to the fuel contained inside the inner fuel container. The outer fuel container can be relatively rigid or flexible.

In a different embodiment, the invention is directed to a method of controlling the pressure inside a fuel cartridge, comprising the steps of (a) providing a fuel cartridge comprising an outer casing and an inner fuel container, (b) filling the inner fuel container with a first fuel, and (c) filling the space between the outer casing and the fuel container with a second fuel to control the pressure inside the fuel supply. The method may further comprise the steps of (d) providing a check valve on the outer casing and/or (e) providing an outer fuel container encasing the inner fuel container and filling the space between the outer and inner fuel containers with a third fuel.

Other methods of controlling the permeation rate to and from the fuel supply are also disclosed.

DETAILED DESCRIPTION OF THE PREFERRED EMBODIMENTS

Figure 1A:
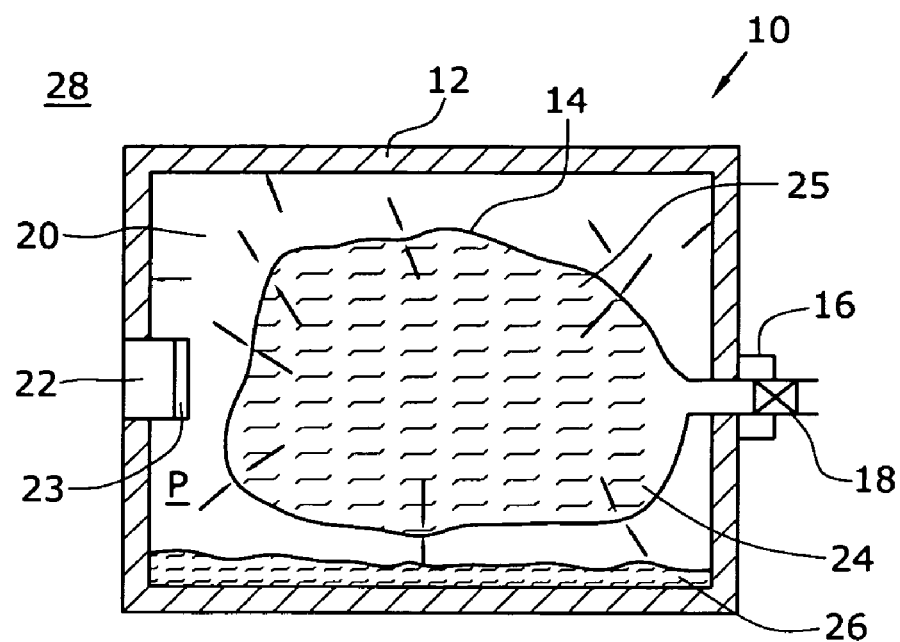
FIG. 1A is a cross-sectional view of a fuel cartridge having fuel outside of the fuel liner, when the fuel liner is relatively full of fuel.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in U.S. published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture of methanol, sodium borohydride, an electrolyte and other compounds, such as those described in U.S. Pat. Nos. 6,554,877; 6,562,497 and 6,758,871, which are incorporated by reference in their entireties. Fuels also include those that are partially dissolved in solvent and partially suspended in solvent, described in U.S. Pat. No. 6,773,470 and those that include both liquid fuel and solid fuels, described in U.S. published patent application number 2002/076602. These references are also incorporated by reference in their entireties.

Fuels also include a metal hydride such as sodium borohydride ($NaBH_4$) and water, discussed above, and the low pressure, low temperature produced by such reaction. Fuels further include hydrocarbon fuels, which include, but are not limited to, butane, kerosene, alcohol and natural gas, disclosed in U.S. published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist (December 2001/January 2002), at pp. 20-25. As used in the present application, the term "fuel cell" also includes microengines. Other applications include storing traditional fuels for internal combustion engines, and hydrocarbons, such as butane for pocket and utility lighters and liquid propane.

When a liquid fuel, such as methanol, is stored in a fuel container, pressure builds within the container over time. The internal pressure can be caused by a number of factors including partial vapor pressure from the fuel in the gaseous state.

Figure 1B:
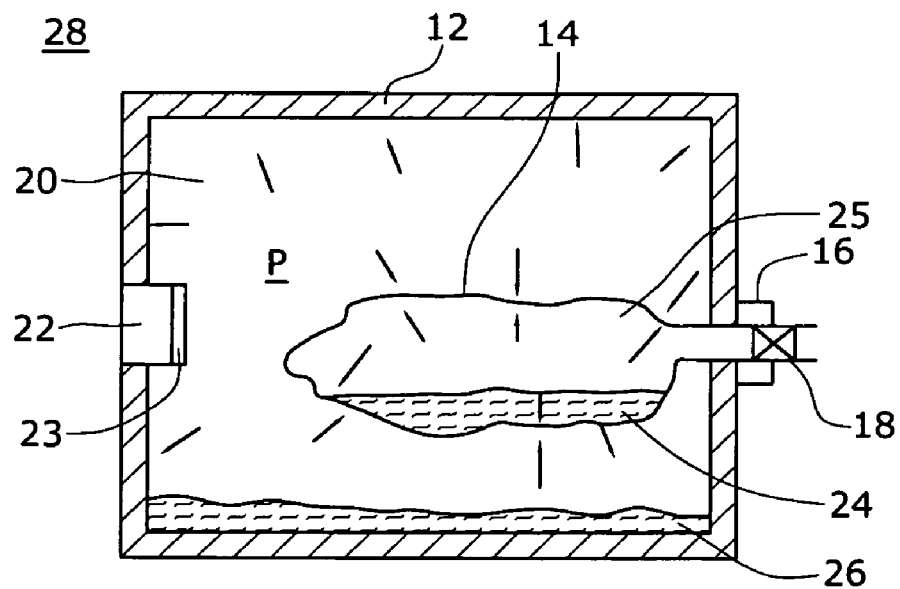
FIG. 1B shows the fuel cartridge of FIG. 1A when the fuel liner contains a relatively small amount of fuel.

Referring to FIGS. 1A and 1B, fuel cartridge 10 comprises an outer casing 12 and a fuel liner 14 disposed within outer casing 12. Fuel cartridge 10 further comprises a nozzle 16 that houses a shut-off valve 18, which fluidly connects fuel liner 14 to a fuel cell (not shown). A space 20 is defined to be the space between outer casing 12 and fuel liner 14. Fuel cartridge 10 further comprises a check valve 22 which is adapted to open when internal pressure inside space 20 reaches a high threshold or a low threshold. Fuel liner 14 contains a fuel 24, such as methanol, and a head space 25 above the liquid fuel, shown most clearly in FIG. 1B. Head space 25 may be present after fuel liner 14 is filled with fuel or may develop after fuel is transported out of fuel liner 14. Head space 25 is typically formed when part of the fuel vaporizes. Between outer casing 12 and fuel liner 14, an amount of fuel 26 is positioned to control the pressure in space 20. Fuel 26 can be introduced before, during or after the process of sealing the outer casing 12. Alternatively, fuel 26 can be added or removed through check valve 22. Fuel 26 also vaporizes or contributes to the vapor pressure in space 20. Fuel 26 can be deposited directly in space 20, or fuel 26 can be stored at least partially in an absorbent member, such as a foam, a filler material or other porous materials.

Outer casing 12 is preferably rigid, but can also be sufficiently flexible to be compressed along with inner liner 14, as fuel is transported from the cartridge. A rigid outer casing can provide structural support to fuel liner 14. Outer casing 12 is preferably made from metals, such as stainless steel and cold rolled steel, or polymers, such as polyacetal resin or polyphenylene sulfide, which can be injection molded or extruded.

Fuel liner 14 is preferably flexible and deformable, such that the volume inside fuel liner 14 decreases when fuel is being transported to the fuel cell. More preferably, fuel liner 14 is thin and made from a durable and flexible material so that it efficiently collapses or reduces its volume as fuel is withdrawn. Examples of materials for the fuel liner 14 include natural rubber, polyethylene (including low density to high density PE), ethylene propylene (EP), EPDM and other thin polymeric films. Preferably the polyethylene is fluorine based and substantially free of metal ions to ensure low permeation. The polyethylene can be laminated with a vapor barrier layer, such as aluminum foil or fluorine treated plastics, to reduce methanol permeation. Preferably, fuel liner 14 is made from a low density polyethylene and is blow-molded to form a thin-wall bladder. Such a fuel liner and outer casing are fully disclosed in commonly owned, copending patent application Ser. No. 10/629,004 entitled "Fuel Cartridge with Flexible Liner," filed on Jul. 29, 2003. The '004 application is incorporated herein by reference in its entirety.

Nozzle 16 and shut-off valve 18 are adapted to be connected to a fuel cell (not shown) or to a refilling fuel container/cartridge/supply. Shut-off valves are fully discussed in commonly owned, co-pending patent application entitled "Fuel Cartridge with Connecting Valve," U.S. application Ser. No. 10/629,006, filed on Jul. 29, 2003 ("the '006 application"), the disclosure of which is incorporated herein by reference in its entirety. Shut-off valve 18 can also be replaced by a porous material capable of transporting fuel through capillary or wicking action.

Check valve 22 is preferably a unidirectional relief valve commonly known as a poppet valve or poppet-type valve. Suitable check valves are disclosed in the '004 patent application. Check valve 22 allows air to enter space 20 intermittently to prevent buildup of a partial vacuum inside the fuel cartridge 10, as fuel is withdrawn from the cartridge. Alternatively, check valve 22 may be configured in an opposite direction to allow pressure within space 20 to be vented to the atmosphere. Additionally, check valve 22 also may be adapted to allow methanol to be added to or removed from the cartridge.

Preferably, check valve 22 is used in conjunction with optional membrane 23, which is adapted to allow only air or other gases to enter or leave the cartridge and keep liquid from entering or leaving the cartridge. Such a gas permeable, liquid impermeable membrane is disclosed in commonly owned, co-pending patent application Ser. No. 10/356,793, entitled "Fuel Cartridge for Fuel Cells," filed on Jan. 31, 2003; in U.S. Pat. No. 3,508,708, entitled "Electric Cell with Gas Permeable Vent Stopper," issued on Apr. 21, 1970; and in U.S. Pat. No. 4,562,123, entitled "Liquid Fuel Cell," issued on Dec. 31, 1985. The disclosures of these references are incorporated herein by reference in their entireties. Such membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W. L Gore Associates, Inc. Gore-Tex® is a suitable membrane. Gore-Tex® is a microporous membrane containing pores that are too small for liquid to pass through, but are large enough to let gas through.

Membrane 23 can be replaced by filler materials, such as those disclosed in the '793 patent application. As used herein, filler materials include foam and similarly absorbent materials. Filler materials retain liquids and allow gases to pass through. A suitable filler material is the absorbent material used in diapers. Preferably, these filler materials also swell when absorbing liquid, and become less permeable to liquid. Membrane or filler 23 can also be positioned proximate to nozzle 16 or valve 18 or other orifices to retain fuel 26 within casing 12.

Figure 1C:
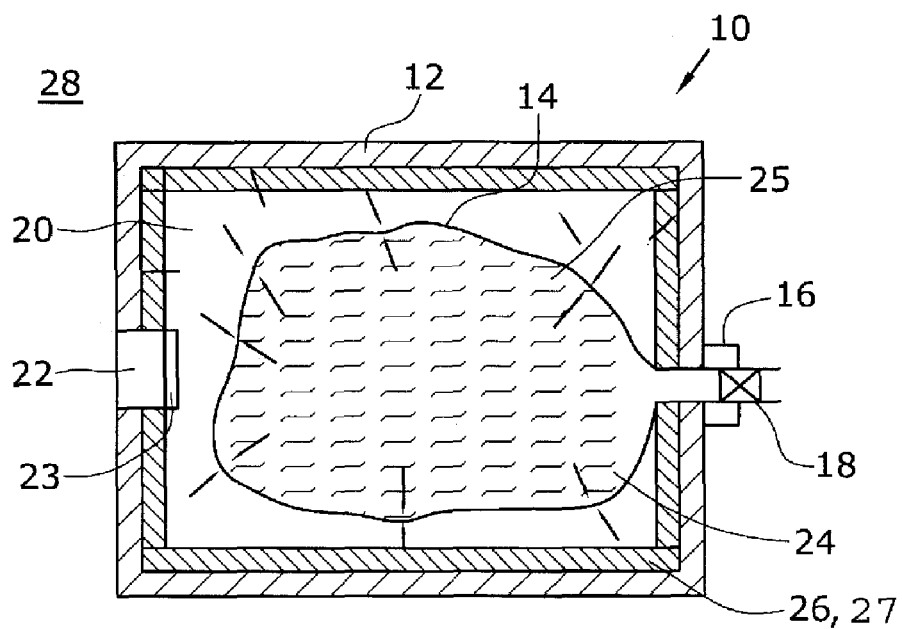
FIG. 1C shows another embodiment of FIG. 1A with cushions holding the fuel outside of the fuel liner.

Cartridge 10 may also have one or more cushions 27, which can be porous or which can have methanol or fuel retaining mechanism contained therein, that line the interior surface of outer casing 12, as shown in FIG. 1C. Cushions 27 may include springs. Cushions 27 are adapted to cushion fuel liner 14 from impacts. Cushions 27 can be elastic or deformable. In one embodiment, cushion 27 can be porous and adapted to hold fuel 26 therewithin.

The ideal gas laws generally govern the pressure buildup inside fuel liner 14. Boyle's law states that at constant temperature, the volume of a gas varies inversely with the pressure. Charles' law states that at constant pressure, the volume of a gas varies directly with the absolute temperature and that at constant volume, the pressure of a gas varies directly with the absolute temperature. Dalton's law states that the total pressure of a mixture of gases is equal to the sum of the partial pressures due to each type of gas. Without being limited to any theory, Dalton's law will be used to describe the invention.

When fuel liner 14 is relatively full of fuel as shown in FIG. 1A, the total pressure ($P_{total-25-A}$) of head space 25 is equal to the sum of the partial pressure of methanol gas ($P_{methanol-25-A}$) from fuel 24 and the partial pressure of the other gases, including air ($P_{gas-25-A}$).

$$P_{total-25-A} = P_{methanol-25-A} + P_{gas-25-A}$$

Also, when the fuel liner is relatively full of fuel, the total pressure ($P_{total-20-A}$) of the space 20 is equal to the sum of the partial pressure of methanol gas ($P_{methanol-20-A}$) from the small amount of fuel 26 in space 20 and the partial pressure of the other gases, including air ($P_{air-20-A}$):

$$P_{total-20-A} = P_{methanol-20-A} + P_{air-20-A}$$

When fuel liner 14 is partially empty as shown in FIG. 1B, fuel liner 14 is in a partially collapsed stage. Under some circumstances, e.g., when the partially empty fuel liner is left unused for a long period of time, the vapor pressure in head space 25 can build up. As such, the total pressure ($P_{total-25-B}$) of head space 25 is equal to the sum of the partial pressure of methanol ($P_{methanol-25-B}$) and the partial pressure of other gases ($P_{gas-25-B}$).

$$P_{total-25-B} = P_{methanol-25-B} + P_{gas-25-B}$$

Also, when fuel liner 14 is partially empty, the total pressure ($P_{total\text{-}20\text{-}B}$) of space 20 is equal to the sum of the partial pressure of methanol ($P_{methanol\text{-}20\text{-}B}$) and the partial pressure of the air or other gases ($P_{air\text{-}20\text{-}B}$):

$$P_{total\text{-}20\text{-}B} = P_{methanol\text{-}20\text{-}B} + P_{air\text{-}20\text{-}B}$$

At any given time, the total pressure of space 20 is equal to the total pressure of head space 25, because space 20 and head space 25 are at substantially the same temperature. Space 20 and head space 25 are also at substantially the same pressure, because they are separated only by flexible liner 14. Therefore:

$$P_{total\text{-}25\text{-}A} = P_{total\text{-}20\text{-}A}, \text{ and}$$

$$P_{total\text{-}25\text{-}B} = P_{total\text{-}20\text{-}B}$$

According to another aspect of the present invention, the amount of methanol 26 placed in space 20 should be sufficient so that at least a portion of methanol 26 remains in the liquid phase. This is to ensure that as the volume of methanol 24 inside fuel liner 14 decreases, sufficient gas can evaporate from methanol 26 to replace the lost volume. Hence, the placement of methanol in space 20 and the subsequent vaporization of this fuel create a pressure in space 20 that is substantially similar to the vapor pressure inside fuel liner 14 in head space 25. Hence, the pressure inside cartridge 10 is in equilibrium, and any internal pressure build-up inside fuel liner 14 is counteracted by substantially the same pressure in space 20. If the amount of methanol 26 is not sufficient to maintain some of the methanol 26 in the liquid phase, then the pressure in fuel liner 24 may be higher than the pressure in space 20.

In accordance with another aspect of the present invention, the presence of methanol vapors in space 20 serves as a buffer zone that minimizes methanol 24 from leaving fuel liner 14. One of the reasons that methanol 24 inside fuel liner 14 migrates outside of the fuel liner is that a methanol gradient exists from the relatively high methanol vapor concentration within fuel liner 14 to the relatively low methanol vapor concentration in the atmosphere outside of cartridge 10, labeled as 28. By having a methanol concentration in space 20, the migration of methanol now includes the migration from space 20 to atmosphere 28 and from head space 25 to space 20, thereby reducing the migration rate from head space 25 to atmosphere 28. Additionally, the walls of outer casing 12 can be made from a low permeation material, such as metal, for example stainless steel, cold rolled steel or aluminum, or polyacetal, for example, Delrin®. These walls can also be made thicker and/or be coated, lined or wrapped with low permeation materials. Such coatings and wraps are fully disclosed in commonly owned, co-pending application Ser. No. 10/913,715, entitled "Fuel Supplies for Fuel Cells," filed on Aug. 6, 2004. This application is incorporated herein by reference in its entirety. In essence, the methanol vapors in space 20 serve as a barrier that can reduce the permeation effects.

Furthermore, the invention allows for the regulation of pressure when temperature of fuel cartridge 10 varies from hot to cold. While an increase in the temperature increases the partial pressures of gases in space 20, the temperature increase also increases the partial pressure in head space 25 to maintain pressure equilibrium inside fuel cartridge 10.

Figure 2:
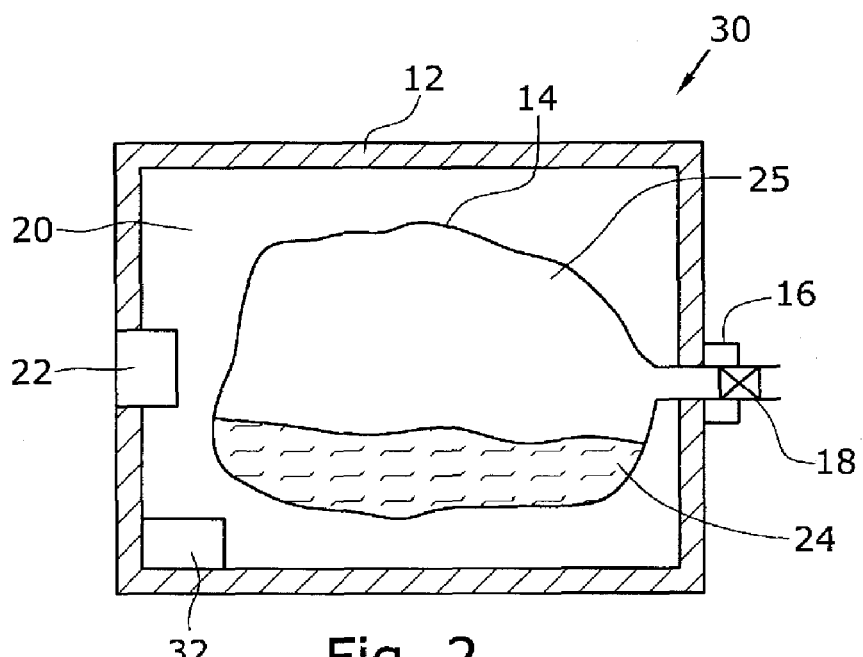
FIG. 2 is a longitudinal cross-sectional view of a fuel cartridge having a gel containing fuel outside of the fuel liner.

Referring to FIG. 2, a fuel cartridge 30 comprises, among other components, a methanol gel 32 used in space 20 between an outer casing 12 and a fuel liner 14. Otherwise, the components of fuel cartridge 30 are similar to those described in FIGS. 1A and 1B.

Methanol gel is available from a variety of sources, such as from widely available food warming products. Methanol gel can be formulated from denatured methanol, water and gel. Methanol gel is normally used as a source of methanol inside small burners to keep coffee urns and food containers warm in restaurants and banquet halls. Because methanol gel burns smoothly and safely, it is a convenient source of fuel in the restaurant industry. An effective amount of methanol gel 32 can be placed inside outer casing 12 to generate an effective amount of partial pressure of methanol to counteract the pressure buildup inside the fuel liner 14.

Figure 3:
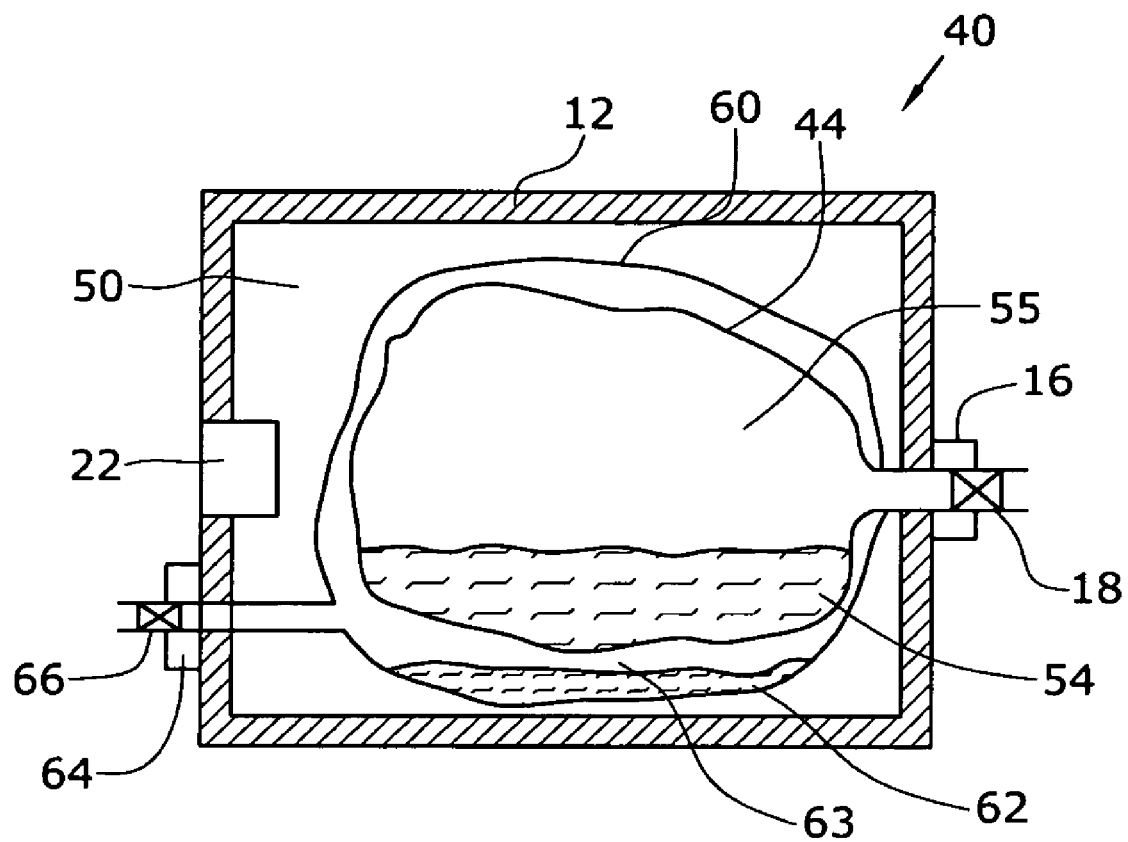
FIG. 3 is a longitudinal cross-sectional view of a fuel cartridge having an outer liner containing methanol, and an inner liner as fuel liner.

Referring to FIG. 3, a fuel cartridge 40 comprises an outer fuel liner 60 and an inner fuel liner 44 containing a fuel 54. An outer fuel liner 60 encases inner fuel liner 44. In space 63 between outer fuel liner 60 and inner fuel liner 44, there is an effective amount of methanol 62 to control the pressure inside inner fuel liner 44, which does so in a manner similar to the embodiment described above with respect to FIGS. 1A-C. This embodiment is otherwise substantially similar to the embodiment described above with respect to FIGS. 1A-C. Fuel cartridge 40 further comprises an optional nozzle 64 that houses an optional check valve 66, which is in fluid communication with space 63 between outer fuel liner 60 and inner fuel liner 44. An additional amount of methanol can also be positioned in space 50 between an outer casing 12 and outer fuel liner 60 to provide an additional buffer, similar to the buffer described above with respect to FIGS. 1A-C.

It will be noted that while methanol (24, 26, 54, 62) is used herein to describe the present invention, this invention is not so limited. The present invention is suited for use with any fuel that may develop partial vapor pressure inside the fuel supply, e.g., methanol, ethanol, propanol, hydrocarbons (butane, propane, etc.). Additionally, fuel 24, 54 inside fuel liner 14, 44 can be different from fuel 26, 62 inside space 20, 50, 63, so long as the vapors created by the fuels have reduced partial pressure profiles between the two chambers. For example, if fuel 24, 54 is methanol then the fuel positioned inside space 20, 50, 63 can be methanol, ethanol, propanol or other alcohols. If fuel 24, 54 is a hydrocarbon, then fuel 26, 62 inside space 20, 50, 63 should be the same hydrocarbon or another hydrocarbon.

In accordance with another aspect of the present invention, fuel 26, 62 in space 20, 50, 63 can be replaced by any substance that can provide positive vapor pressure at the temperature and pressure within which cartridge 10, 30, 40 operates. In other words, fuel 26, 62 can be replaced by any substance that is capable of providing a "positive" pressure in space 20, 50, 63 that is higher than the pressure provided by ambient air that occupies space 20, 50, 63 after fuel cartridge 10, 30, 40 is manufactured. This residual air cannot sufficiently expand to occupy the space of the fuel withdrawn from fuel liner 14, 44 during use. Such substance includes liquids and solids that change to gases (sublimation) or change to liquids and then gases. Exemplary subliming solids include, but are not limited to, dry ice ($CO_2$), iodine crystals and naphthalene (moth balls), among others. Suitable liquids include, but are not limited to, water, methane and hydrocarbons. Gels, such as methanol gels discussed above, can also be used.

In accordance with another aspect of the present invention, another fuel 26, 62 is placed in space 20, 50, 63 to pressurize cartridge 10, 30, 40. Suitable fuels include, but are not limited to, hydrocarbons in liquid and gaseous phases, such as n-butane, iso-butane and propane. The inventors of the present invention have discovered that so long as some portion of fuel 26, 62, albeit very small, remains in the liquid phase, then the pressure in space 20, 50, 63 is steady at about 30 psi at room temperature. This provides a convenient way to maintain positive pressure on fuel liner 14, 44.

Another advantage of the present invention is that once fuel liner 14, 44 is substantially emptied, the residual fuel 24, 54 therein would not re-inflate fuel liner 14, 44 to the equalizing pressure in space 20, 50, 63.

Figure 4A:
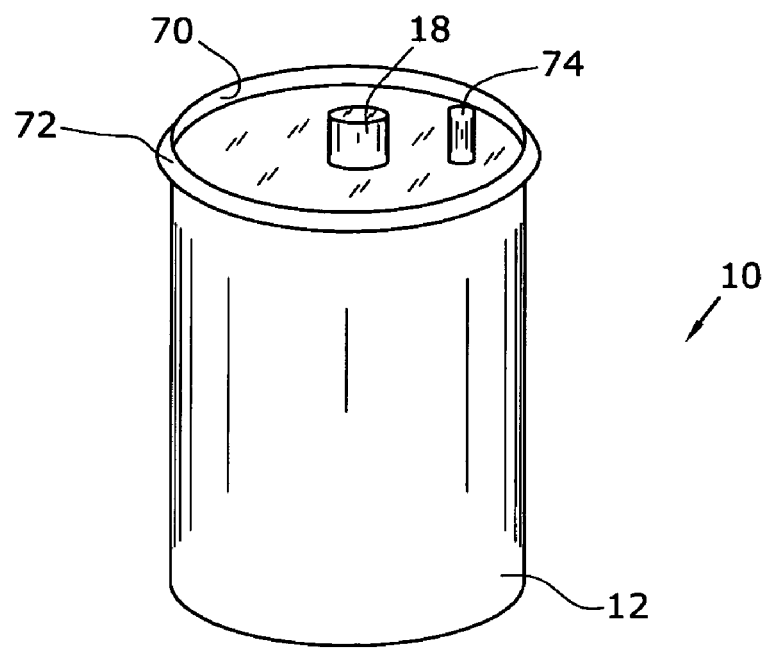
FIG. 4A is a perspective view of another embodiment of the present invention.
Figure 4B:
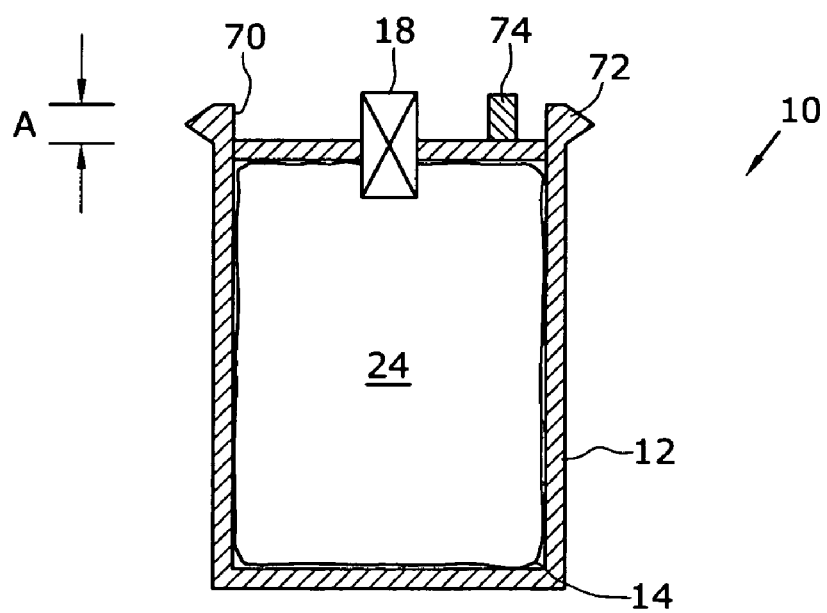
FIG. 4B is a cross-sectional view of the fuel cartridge of FIG. 4A.

In another embodiment of the present invention, outer casing 12 is made from a metal such as stainless steel, aluminum, tin or any metals that can be made into a can or made from any known polymers, as shown in FIG. 4A. The inside surface of outer casing 12 is preferably smooth with a smoothness similar to that of polished sheet metals. The outer surface of liner 14 is similarly smooth. When the two smooth surfaces come into contact with each other as illustrated in FIG. 4B, it was observed that the two contacting smooth surfaces reduce the permeation rate of gas into and out of liner 14. Preferably, the volume of liner 14 when fully filled is slightly larger than the volume of outer casing 12 to encourage contact between the smooth outer surface of the liner and the smooth inner surface of the casing. Even when the fuel in liner 14 is partially depleted, the permeated air and/or fuel vapors occupy the volume of the used fuel to inflate fuel liner 14 into contact with the smooth inside surface of outer casing 12 to halt or reduce further permeation.

The shape of casing 12 and liner 14 is preferably round, i.e., without sharp corners, such as oval or circular prisms or cylinders. In one embodiment as illustrated in FIGS. 4A and 4B, casing 12 is a cylindrical can with raised protruding lip 70 on at least the top end. Height "A" of raised protruding lip 70 is preferably greater than the height of conventional cans, e.g., cans containing food, so that conventional can openers would not be able to open casing 12. In one example, height "A" is at least about 0.5 cm. Casing 12 may also have protruding bead 72 around the outside of lip 70 as shown. Protruding bead 72 makes more difficult for conventional can openers to wrap around lip 70. Protruding bead 72 can also be located inside lip 70, and can be used in conjunction with a lip with conventional height. Furthermore, casing 12 may also have upstanding protrusion 74 on the top end thereof. Protrusion 74 can block some conventional can openers from grabbing on to the lip of casing 12 and makes more difficult for conventional can openers to open casing 12. Upstanding protrusion 74 may be a single distinct upstanding member as shown in FIG. 4B, or may comprise multiple upstanding members, or be a continuous upstanding member located concentric to lip 70.

Alternatively, both ends of casing 12 have no protruding members to render more difficult the removal of the ends by conventional can openers.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A fuel supply connectable to a fuel cell comprising:
an outer casing;
a fuel container comprising a first fuel for the fuel cell and a first head space, wherein the first head space comprises an amount of the first fuel in a first vapor state with a first vapor pressure and the first head space has a total pressure $P_1$; and
a second space, between the outer casing and the fuel container, comprising a non-gaseous material, wherein the second space comprises an amount of the non-gaseous material in a second vapor state with a second vapor pressure and the second space has a total pressure $P_2$ substantially in equilibrium with $P_1$ as the first fuel is transported from the fuel container.

2. The fuel supply of claim 1, wherein the non-gaseous material comprises a second fuel.

3. The fuel supply of claim 2, wherein the first fuel is different from the second fuel.

4. The fuel supply of claim 3, wherein the first fuel is methanol.

5. The fuel supply of claim 2, wherein the first fuel and the second fuel are substantially similar.

6. The fuel supply of claim 5, wherein the first and second fuels comprise methanol.

7. The fuel supply of claim 1, wherein at least a portion of the non-gaseous material is contained within an absorbent member.

8. The fuel supply of claim 7, wherein the absorbent member comprises a porous material.

9. The fuel supply of claim 7, wherein the absorbent member comprises a filler material.

10. The fuel supply of claim 7, wherein the absorbent member comprises a foam.

11. The fuel supply of claim 1, wherein the outer casing comprises a check valve.

12. The fuel supply of claim 11, wherein the outer casing further comprises a liquid impermeable membrane cooperating with the check valve.

13. The fuel supply of claim 11, wherein the outer casing further comprises a liquid retainer cooperating with the check valve.

14. The fuel supply of claim 1, wherein the non-gaseous material comprises a gel.

15. The fuel supply of claim 14, wherein the gel comprises a methanol gel.

16. The fuel supply of claim 1, wherein the non-gaseous material comprises a solid.

17. The fuel supply of claim 16, wherein the solid comprises a subliming solid.

18. The fuel supply of claim 17, wherein the subliming solid comprises iodine or naphthalene.

19. The fuel supply of claim 1, wherein the non-gaseous material comprises a liquid.

20. The fuel supply of claim 19, wherein the liquid comprises water, hydrocarbon or methanol.

21. The fuel supply of claim 19, wherein at least a portion of the non-gaseous material remains in the liquid phase until substantially all the first fuel has been transported from the fuel container.

22. The fuel supply of claim 19, wherein the liquid non-gaseous material comprises a hydrocarbon.

23. The fuel supply of claim 22, wherein the hydrocarbon comprises n-butane, iso-butane or propane.

24. The fuel supply of claim 1, wherein the outer casing is substantially rigid.

25. The fuel supply of claim 1, wherein the fuel container is deformable.

26. The fuel supply of claim 1, wherein the fuel container is elastic.

27. The fuel supply of claim 1, wherein the fuel container is encased within an outer fuel container.

28. The fuel supply of claim 27, wherein a second vapor pressure material is contained in the space between the outer fuel container and the fuel container.

29. The fuel supply of claim 28, wherein the second vapor pressure material comprises a third fuel, which is different from the first fuel.

30. The fuel supply of claim 28, wherein the second vapor pressure material comprises a third fuel which is substantially similar to the first fuel.

31. The fuel supply of claim 28, wherein said first non-gaseous material is different from said second vapor pressure material.

32. The fuel supply of claim 28, wherein said first non-gaseous material is substantially similar to said second vapor pressure material.

33. The fuel supply of claim 28, wherein the outer fuel container is flexible.

34. The fuel supply of claim 1 further comprising a cushion adapted to soften impacts on the fuel container.

35. The fuel supply of claim 34, wherein the cushion comprises a porous medium.

36. The fuel supply of claim 35, wherein at least some of the non-gaseous material is contained within the cushion.

37. A fuel supply connectable to a fuel cell, comprising:
an outer casing; and
a fuel container containing a first fuel for the fuel cell and having a first concentration of fuel, wherein a buffer zone is disposed in a space between the outer casing and the fuel container, wherein the buffer zone comprises a second concentration of a second fuel for the fuel cell that reduces the fuel concentration gradient from inside the fuel container to the atmosphere outside the outer casing.

38. The fuel supply of claim 37, wherein the at least a portion of the second fuel is in a vapor state.

39. The fuel supply of claim 38, wherein the first fuel is substantially similar to the second fuel.

40. The fuel supply of claim 38, wherein the first fuel is different than the second fuel.

41. The fuel supply of claim 37, wherein the first fuel comprises methanol.

42. A fuel supply connectable to a fuel cell comprising:
an outer casing;
a fuel container comprising a first fuel for the fuel cell and a first head space, wherein the first head space comprises an amount of the first fuel in a first vapor state with a first vapor pressure and the first head space has a total pressure $P_1$; and
a second space, between the outer casing and the fuel container, comprising a second fuel for the fuel cell, wherein the second space comprises an amount of the second fuel in a second vapor state with a second vapor pressure and the second space has a total pressure $P_2$ substantially in equilibrium with $P_1$ as the first fuel is transported from the fuel container.

43. The fuel supply of claim 42, wherein the first fuel is different from the second fuel.

44. The fuel supply of claim 42, wherein the first fuel and the second fuel are substantially similar.

* * * * *